(12) United States Patent
Shigeeda

(10) Patent No.: US 10,589,586 B2
(45) Date of Patent: Mar. 17, 2020

(54) INTER-VEHICLE TRANSFER APPARATUS

(71) Applicant: MITSUBISHI ELECTRIC CORPORATION, Chiyoda-ku, Tokyo (JP)

(72) Inventor: Tetsuya Shigeeda, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 255 days.

(21) Appl. No.: 15/744,206

(22) PCT Filed: Jul. 21, 2015

(86) PCT No.: PCT/JP2015/070660
§ 371 (c)(1),
(2) Date: Jan. 12, 2018

(87) PCT Pub. No.: WO2017/013730
PCT Pub. Date: Jan. 26, 2017

(65) Prior Publication Data
US 2018/0201079 A1    Jul. 19, 2018

(51) Int. Cl.
*B61G 5/10*        (2006.01)
*B60D 1/64*        (2006.01)
(Continued)

(52) U.S. Cl.
CPC .............. *B60D 1/64* (2013.01); *B60L 15/42* (2013.01); *B61G 5/10* (2013.01); *H01F 38/00* (2013.01);
(Continued)

(58) Field of Classification Search
CPC .................................. B60D 1/64; B61G 5/10
(Continued)

(56) References Cited

U.S. PATENT DOCUMENTS

| 4,745,299 A    | 5/1988 | Eng et al. | |
| 6,373,886 B1* | 4/2002 | Moon ................... | G06F 1/26 375/220 |
| 2004/0037300 A1* | 2/2004 | Lehr ...................... | G06F 1/26 370/401 |

(Continued)

FOREIGN PATENT DOCUMENTS

| EP | 0 243 061 A2 | 10/1987 |
| EP | 2 139 171 A1 | 12/2009 |
| JP | 02-071621 A  | 3/1990 |

OTHER PUBLICATIONS

Extended European Search Report dated Mar. 6, 2019, issued by the European Patent Office in corresponding European Application No. 15898890.7. (9 pages).

(Continued)

*Primary Examiner* — Adi Amrany
(74) *Attorney, Agent, or Firm* — Buchanan Ingersoll & Rooney PC

(57) ABSTRACT

An inter-vehicle transfer apparatus in a vehicle includes a pulse transformer and auxiliary coils. The pulse transformer includes a first coil wound around a core and connected at one end to an electrical coupler; a capacitor connected at one end to the other end of the coil; and a second coil wound around the core in the same direction as the first coil, connected at one end to the other end of the capacitor, and connected at the other end to the electrical coupler. One auxiliary coil is connected at one end to the first coil. The other auxiliary coil is connected at one end to the second coil. In the inter-vehicle transfer apparatus, the other end of one auxiliary coil and the other end of the other auxiliary coil are connected to each other to enable application of a direct-current voltage across contact portions in the electrical coupler.

5 Claims, 4 Drawing Sheets

(51) Int. Cl.
*H04B 3/02* (2006.01)
*B60L 15/42* (2006.01)
*H01F 38/00* (2006.01)
H01F 27/24 (2006.01)
H01F 27/28 (2006.01)

(52) U.S. Cl.
CPC ............... *H04B 3/02* (2013.01); *H01F 27/24* (2013.01); *H01F 27/28* (2013.01)

(58) Field of Classification Search
USPC ......................................................... 307/9.1
See application file for complete search history.

(56) References Cited

U.S. PATENT DOCUMENTS

| | | |
|---|---|---|
| 2010/0091663 A1 | 4/2010 | Takeyama et al. |
| 2016/0134319 A1* | 5/2016 | Shigeeda ................ B60L 15/42 307/10.1 |

OTHER PUBLICATIONS

International Search Report (PCT/ISA/210) dated Oct. 27, 2015, by the Japanese Patent Office as the International Searching Authority for International Application No. PCT/JP2015/070660.
Written Opinion (PCT/ISA/237) dated Oct. 27, 2015, by the Japanese Patent Office as the International Searching Authority for International Application No. PCT/JP2015/070660.

* cited by examiner

INTER-VEHICLE TRANSFER APPARATUS

FIELD

The present invention relates to an inter-vehicle transfer apparatus that is mounted in a vehicle and that transfers a signal to another vehicle electrically coupled via an electrical coupler.

BACKGROUND

Conventionally, while communication between vehicles coupled each other by an electrical coupler is performed through contact portions in the electrical coupler, sometimes an oxide film is formed on a surface of the contact portions. In this state, a failure of contact can occur between the contact portions, causing a communication failure between the vehicles.

In this connection, Patent Literature 1 discloses a technique in which, in a signal transfer system that transfers a signal through contact portions in a connector of a wired line, an oxide film is broken by applying a direct-current component by a direct-current voltage supply applied to the contact portions. A transmission portion in this case is configured to include a transmission amplifier, a transformer connected to the transmission amplifier, a coupling capacitor connected to the transformer and the connector, and the direct-current voltage supply connected between the coupling capacitor and the connector via a choke coil.

CITATION LIST

Patent Literature

Patent Literature 1: Japanese Patent Application Laid-open No. H2-71621

SUMMARY

Technical Problem

However, the conventional technique described in Patent Literature 1 has a problem in that, because the direct-current voltage supply and the transformer are connected to each other via the capacitor, the transformer serves as a resistor component and disturbs signal waveforms in the data communication, causing degradation of signal quality.

The present invention has been achieved in view of the above problems, and an objective of the present invention is to provide an inter-vehicle transmission apparatus that can break an oxide film on a surface of a contact portion in an electrical coupler, while suppressing degradation of signal quality.

Solution to Problem

In order to solve the problem mentioned above and achieve the objective, the present invention relates to an inter-vehicle transfer apparatus mounted in a vehicle to transfer a signal to another vehicle to which the vehicle is electrically coupled via an electrical coupler. The inter-vehicle transfer apparatus includes: a pulse transformer including a first coil wound around a core and connected at one end to the electrical coupler, a capacitor connected at one end to the other end of the first coil, and a second coil wound around the core in a same direction as the first coil, connected at one end to the other end of the capacitor, and connected at the other end to the electrical coupler; a first auxiliary coil wound around the core in an opposite direction to the first and second coils and having an equal number of turns as the first coil, and connected at one end to the other end of the first coil; and a second auxiliary coil wound around the core in an opposite direction to the first and second coils and having an equal number of turns as the second coil, and connected at one end to the one end of the second coil. The other end of the first auxiliary coil and the other end of the second auxiliary coil are connected each other to enable application of a direct-current voltage across contact portions in the electrical coupler.

Advantageous Effects of Invention

According to the present invention, an oxide film on a surface of a contact portion in an electrical coupler can be broken, while suppressing degradation of signal quality.

DESCRIPTION OF EMBODIMENTS

Exemplary embodiments of an inter-vehicle transfer apparatus according to the present invention will be explained below in detail with reference to the accompanying drawings. The present invention is not limited to the embodiments.

First Embodiment

Figure 1:
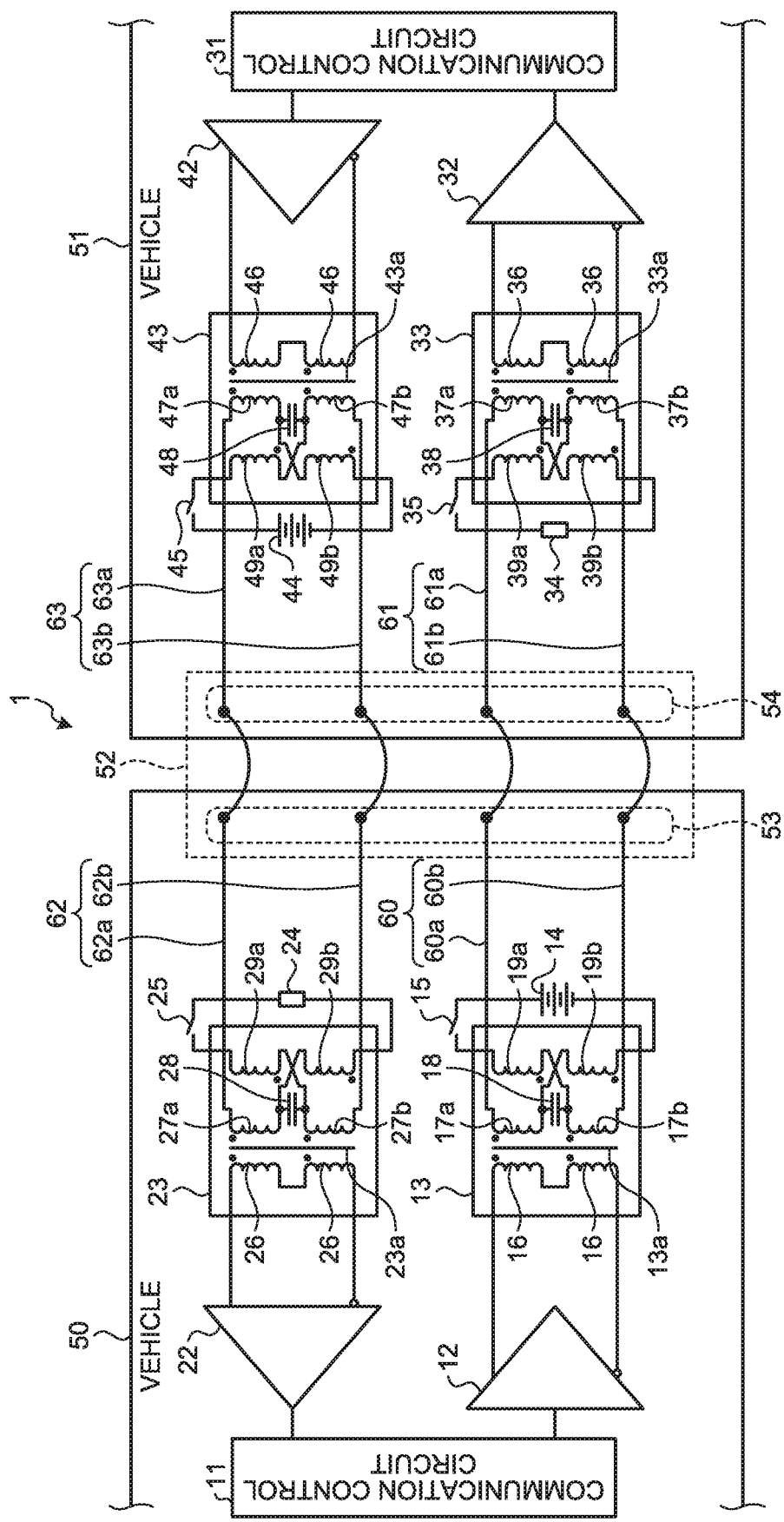
FIG. 1 illustrates a configuration example of an inter-vehicle transfer system according to a first embodiment.

FIG. 1 illustrates a configuration example of an inter-vehicle transfer system 1 according to an embodiment of the present invention. The inter-vehicle transfer system 1 includes an inter-vehicle transfer apparatus mounted in a vehicle 50; an inter-vehicle transfer apparatus mounted in a vehicle 51 that is mechanically coupled to the vehicle 50; and an electrical coupler 52 that electrically couples the vehicles 50 and 51 each other. The vehicles 50 and 51 compose a train formation. It is also acceptable if the formation includes two or more vehicles and the configuration illustrated in FIG. 1 is applied to arbitrary vehicles in the formation. The electrical coupler 52 is formed of an electrical coupler 53 that is provided in the vehicle 50 and an electrical coupler 54 that is provided in the vehicle 51 and coupled to the electrical coupler 53. The electrical couplers 53 and 54 include contact portions (not illustrated) that can come into contact with and be separated from each other. In the illustrated example, the electrical couplers 53 and 54 are coupled to each other, and the vehicles 50 and 51 are electrically connected to each other by the electrical coupler 52.

Next, a configuration of the vehicle 50 is described. The inter-vehicle transfer apparatus mounted in the vehicle 50 is an apparatus that can transfer a signal to the vehicle 51 electrically coupled thereto via the electrical coupler 52. The inter-vehicle transfer apparatus mounted in the vehicle 50 includes a communication control circuit 11; a transmission circuit 12 connected to the communication control circuit 11; a pulse transformer 13 that is provided between the communication control circuit 11 and the electrical coupler 53 and is connected to the transmission circuit 12; auxiliary coils 19a and 19b connected to the pulse transformer 13; a direct-current power supply 14 that is provided between the auxiliary coils 19a and 19b and connected to the auxiliary coils 19a and 19b in series; a switch 15 connected to the auxiliary coils 19a and 19b and the direct-current power supply 14 in series; a twisted pair cable 60 that connects the pulse transformer 13 and the electrical coupler 53 each other; a reception circuit 22 connected to the communication control circuit 11; a pulse transformer 23 that is provided between the communication control circuit 11 and the electrical coupler 53 and is connected to the reception circuit 22; auxiliary coils 29a and 29b connected to the pulse transformer 23; a load resistance 24 that is provided between the auxiliary coils 29a and 29b and connected to the auxiliary coils 29a and 29b in series; a switch 25 connected to the auxiliary coils 29a and 29b and the load resistance 24 in series; and a twisted pair cable 62 that connects the pulse transformer 23 and the electrical coupler 53 each other.

The communication control circuit 11 is a communication controller that controls communication with the vehicle 51. The transmission circuit 12 is a transmitter that transmits a signal to the vehicle 51. The reception circuit 22 is a receiver that receives a signal from the vehicle 51. The twisted pair cable 60 is formed of a pair of transfer paths 60a and 60b and constitutes a communication path between the pulse transformer 13 and the electrical coupler 53. The twisted pair cable 62 is formed of a pair of transfer paths 62a and 62b and constitutes a communication path between the pulse transformer 23 and the electrical coupler 53.

The pulse transformer 13 includes a core 13a; a coil 16 that is wound around the core 13a and is connected at both ends to the transmission circuit 12; a coil 17a that is wound around the core 13a and is connected at one end to the electrical coupler 53 via the transfer path 60a; a capacitor 18 that is connected at one end to the other end of the coil 17a; and a coil 17b that is wound around the core 13a in the same direction as the coil 17a, is connected at one end to the other end of the capacitor 18, and is connected at the other end to the electrical coupler 53 via the transfer path 60b.

The coil 16 is a coil on the primary side that is wound around the core 13a constituting the pulse transformer 13. In this case, the primary side is the transmission circuit 12 side.

The coil 17a is a coil on the secondary side that is wound around the core 13a. In this case, the secondary side is the electrical coupler 53 side. The coil 17b is a coil on the secondary side and is wound around the core 13a in the same direction as the coil 17a. The coil 17b and the coil 17a are connected in series, i.e., the coils 17a and 17b constitute a coil on the secondary side. In the illustrated example, the number of turns of the coil 17a and the number of turns of the coil 17b are equal to each other. In the following descriptions, the coils 17a and 17b can be also referred to as "a coil 17". The transformation ratio of the pulse transformer 13 is determined by the ratio of the number of turns of the coil 16 to the number of turns of the coil 17.

The capacitor 18 is inserted between the coil 17a and the coil 17b and connects them in series, i.e., one end of the capacitor 18 is connected to the other end of the coil 17a, and the other end of the capacitor 18 is connected to one end of the coil 17b. Therefore, the coils 17a and 17b are electrically connected each other when there is an alternating current but are insulated from each other when there is a direct current. Further, the number of turns of the coil 17a and the number of turns of the coil 17b are equal to each other. Therefore, the capacitor 18 is inserted at the midpoint between the coils 17a and 17b.

The auxiliary coil 19a is wound around the core 13a but in the opposite direction to the coils 17a and 17b such that it has the same number of turns as the coil 17b. One end of the auxiliary coil 19a is connected to the one end of the coil 17b, and the other end is connected to a positive side of the direct-current power supply 14 via the switch 15, i.e., the auxiliary coil 19a is wound around the same core 13a as the coils 17a and 17b but in the opposite direction to the coils 17a and 17b such that it has the same number of turns as the coil 17b.

Similarly, the auxiliary coil 19b is wound around the core 13a but in the opposite direction to the coils 17a and 17b such that it has the same number of turns as the coil 17a. One end of the auxiliary coil 19b is connected to the other end of the coil 17a, and the other end is connected to a negative side of the direct-current power supply 14, i.e., the auxiliary coil 19b is wound around the same core 13a as the coils 17a and 17b but in the opposite direction to the coils 17a and 17b such that it has the same number of turns as the coil 17a.

In FIG. 1, the winding direction or the polarity of a coil is indicated by the position of a black circle near the coil in accordance with the standard notation.

The coil 17a is a first coil, the coil 17b is a second coil, the auxiliary coil 19b is a first auxiliary coil, and the auxiliary coil 19a is a second auxiliary coil.

The pulse transformer 23 includes a core 23a; a coil 26 that is wound around the core 23a and is connected at both ends to the reception circuit 22; a coil 27a that is wound around the core 23a and is connected at one end to the electrical coupler 53 via the transfer path 62a; a capacitor 28 that is connected at one end to the other end of the coil 27a; and a coil 27b that is wound around the core 23a in the same direction as the coil 27a, is connected at one end to the other end of the capacitor 28, and is connected at the other end to the electrical coupler 53 via the transfer path 62b.

The coil 26 is a coil on the secondary side that is wound around the core 23a constituting the pulse transformer 23. In this case, the secondary side is the reception circuit 22 side.

The coil 27a is a coil on the primary side that is wound around the core 23a. In this case, the primary side is the electrical coupler 53 side. The coil 27b is a coil on the primary side that is wound around the core 23a in the same direction as the coil 27a. The coil 27b and the coil 27a are connected in series, i.e., the coils 27a and 27b constitute a coil on the primary side. In the illustrated example, the number of turns of the coil 27a and the number of turns of the coil 27b are equal to each other. In the following descriptions, the coils 27a and 27b can be also referred to as "a coil 27". The transformation ratio of the pulse transformer 23 is determined by the ratio of the number of turns of the coil 27 to the number of turns of the coil 26.

The capacitor 28 is inserted between the coil 27a and the coil 27b and connects them in series, i.e., one end of the capacitor 28 is connected to the other end of the coil 27a, and the other end of the capacitor 28 is connected to one end of the coil 27b. Therefore, the coils 27a and 27b are electrically connected each other when there is an alternating current but are insulated from each other when there is a direct current. Further, the number of turns of the coil 27a and the number of turns of the coil 27b are equal to each other. Therefore, the capacitor 28 is inserted at the midpoint between the coils 27a and 27b.

The auxiliary coil 29a is wound around the core 23a but in the opposite direction to the coils 27a and 27b such that it has the same number of turns as the coil 27b. One end of the auxiliary coil 29a is connected to the one end of the coil 27b, and the other end is connected to one end of the load resistance 24, i.e., the auxiliary coil 29a is wound around the same core 23a as the coils 27a and 27b but in the opposite direction to the coils 27a and 27b such that it has the same number of turns as the coil 27b.

Similarly, the auxiliary coil 29b is wound around the core 23a but in the opposite direction to the coils 27a and 27b such that it has the same number of turns as the coil 27a. One end of the auxiliary coil 29b is connected to the other end of the coil 27a, and the other end is connected to the other end of the load resistance 24, i.e., the auxiliary coil 29b is wound around the same core 23a as the coils 27a and 27b but in the opposite direction to the coils 27a and 27b such that it has the same number of turns as the coil 27a.

The coil 27a is a first coil, the coil 27b is a second coil, the auxiliary coil 29b is a first auxiliary coil, and the auxiliary coil 29a is a second auxiliary coil.

Next, a configuration of the vehicle 51 is described. The inter-vehicle transfer apparatus mounted in the vehicle 51 is an apparatus that can transfer a signal to the vehicle 50 to which vehicle 51 is electrically coupled via the electrical coupler 54. The inter-vehicle transfer apparatus mounted in the vehicle 51 includes a communication control circuit 31; a transmission circuit 42 connected to the communication control circuit 31; a pulse transformer 43 that is provided between the communication control circuit 31 and the electrical coupler 54 and is connected to the transmission circuit 42; auxiliary coils 49a and 49b connected to the pulse transformer 43; a direct-current power supply 44 that is provided between the auxiliary coils 49a and 49b and is connected to the auxiliary coils 49a and 49b in series; a switch 45 connected to the auxiliary coils 49a and 49b and the direct-current power supply 44 in series; a twisted pair cable 63 that connects the pulse transformer 43 and the electrical coupler 54 each other; a reception circuit 32 connected to the communication control circuit 31; a pulse transformer 33 that is provided between the communication control circuit 31 and the electrical coupler 54 and is connected to the reception circuit 32; auxiliary coils 39a and 39b connected to the pulse transformer 33; a load resistance 34 that is provided between the auxiliary coils 39a and 39b and is connected to the auxiliary coils 39a and 39b in series; a switch 35 connected to the auxiliary coils 39a and 39b and the load resistance 34 in series; and a twisted pair cable 61 that connects the pulse transformer 33 and the electrical coupler 54.

The communication control circuit 31 is a communication controller that controls communication with the vehicle 50. The transmission circuit 42 is a transmitter that transmits a signal to the vehicle 50. The reception circuit 32 is a receiver that receives a signal from the vehicle 50. The twisted pair cable 63 is formed of a pair of transfer paths 63a and 63b and constitutes a communication path between the pulse transformer 43 and the electrical coupler 54. The twisted pair cable 61 is formed of a pair of transfer paths 61a and 61b and constitutes a communication path between the pulse transformer 33 and the electrical coupler 54.

The pulse transformer 43 includes a core 43a; a coil 46 that is wound around the core 43a and is connected at both ends to the transmission circuit 42; a coil 47a that is wound around the core 43a and is connected at one end to the electrical coupler 54 via the transfer path 63a; a capacitor 48 that is connected at one end to the other end of the coil 47a; and a coil 47b that is wound around the core 43a in the same direction as the coil 47a, is connected at one end to the other end of the capacitor 48, and is connected at the other end to the electrical coupler 54 via the transfer path 63b.

The coil 46 is a coil on the primary side that is wound around the core 43a constituting the pulse transformer 43. In this case, the primary side is the transmission circuit 42 side.

The coil 47a is a coil on the secondary side that is wound around the core 43a. In this case, the secondary side is the electrical coupler 54 side. The coil 47b is a coil on the secondary side that is wound around the core 43a in the same direction as the coil 47a. The coil 47b and the coil 47a are connected in series, i.e., the coils 47a and 47b constitute a coil on the secondary side. In the illustrated example, the number of turns of the coil 47a and the number of turns of the coil 47b are equal to each other. In the following descriptions, the coils 47a and 47b can be also referred to as "a coil 47". The transformation ratio of the pulse transformer 43 is determined by the ratio of the number of turns of the coil 46 to the number of turns of the coil 47.

The capacitor 48 is inserted between the coil 47a and the coil 47b and connects them in series, i.e., one end of the capacitor 48 is connected to the other end of the coil 47a, and the other end of the capacitor 48 is connected to one end of the coil 47b. Therefore, the coils 47a and 47b are electrically connected each other when there is an alternating current but are insulated from each other when there is a direct current. Further, the number of turns of the coil 47a and the number of turns of the coil 47b are equal to each other. Therefore, the capacitor 48 is inserted at the midpoint between the coils 47a and 47b.

The auxiliary coil 49a is wound around the core 43a in the opposite direction to the coils 47a and 47b such that it has the same number of turns as the coil 47b. One end of the auxiliary coil 49a is connected to the one end of the coil 47b, and the other end is connected to a positive side of the direct-current power supply 44 via the switch 45, i.e., the auxiliary coil 49a is wound around the same core 43a as the coils 47a and 47b but in the opposite direction to the coils 47a and 47b such that it has the same number of turns as the coil 47b.

Similarly, the auxiliary coil 49b is wound around the core 43a but in the opposite direction to the coils 47a and 47b such that it has the same number of turns as the coil 47a. One end of the auxiliary coil 49b is connected to the other end of the coil 47a, and the other end is connected to a negative side of the direct-current power supply 44, i.e., the auxiliary coil 49b is wound around the same core 43a as the coils 47a and 47b but in the opposite direction to the coils 47a and 47b such that it has the same number of turns as the coil 47a.

The coil 47a is a first coil, the coil 47b is a second coil, the auxiliary coil 49b is a first auxiliary coil, and the auxiliary coil 49a is a second auxiliary coil.

The pulse transformer 33 includes a core 33a; a coil 36 that is wound around the core 33a and is connected at both ends to the reception circuit 32; a coil 37a that is wound around the core 33a and is connected at one end to the electrical coupler 54 via the transfer path 61a; a capacitor 38 that is connected at one end to the other end of the coil 37a; and a coil 37b that is wound around the core 33a in the same direction as the coil 37a, is connected at one end to the other end of the capacitor 38, and is connected at the other end to the electrical coupler 54 via the transfer path 61b.

The coil 36 is a coil on the secondary side that is wound around the core 33a constituting the pulse transformer 33. In this case, the secondary side is the reception circuit 32 side.

The coil 37a is a coil on the primary side that is wound around the core 33a. In this case, the primary side is the electrical coupler 54 side. The coil 37b is a coil on the primary side that is wound around the core 33a in the same direction as the coil 37a. The coil 37b and the coil 37a are connected in series, i.e., the coils 37a and 37b constitute a coil on the primary side. In the illustrated example, the number of turns of the coil 37a and the number of turns of the coil 37b are equal to each other. In the following descriptions, the coils 37a and 37b can be also referred to as "a coil 37". The transformation ratio of the pulse transformer 33 is determined by the ratio of the number of turns of the coil 37 to the number of turns of the coil 36.

The capacitor 38 is inserted between the coil 37a and the coil 37b and connects them in series, i.e., one end of the capacitor 38 is connected to the other end of the coil 37a, and the other end of the capacitor 38 is connected to one end of the coil 37b. Therefore, the coils 37a and 37b are electrically connected each other when there is an alternating current but are insulated from each other when there is a direct current. Further, the number of turns of the coil 37a and the number of turns of the coil 37b are equal to each other. Therefore, the capacitor 38 is inserted at the midpoint between the coils 37a and 37b.

The auxiliary coil 39a is wound around the core 33a in the opposite direction to the coils 37a and 37b such that it has the same number of turns as the coil 37b. One end of the auxiliary coil 39a is connected to the one end of the coil 37b, and the other end is connected to one end of the load resistance 34, i.e., the auxiliary coil 39a is wound around the same core 33a as the coils 37a and 37b but in the opposite direction to the coils 37a and 37b such that it has the same number of turns as the coil 37b.

Similarly, the auxiliary coil 39b is wound around the core 33a but in the opposite direction to the coils 37a and 37b such that it has the same number of turns as the coil 37a. One end of the auxiliary coil 39b is connected to the other end of the coil 37a, and the other end is connected to the other end of the load resistance 34, i.e., the auxiliary coil 39b is wound around the same core 33a as the coils 37a and 37b but in the opposite direction to the coils 37a and 37b such that it has the same number of turns as the coil 37a.

The coil 37a is a first coil, the coil 37b is a second coil, the auxiliary coil 39b is a first auxiliary coil, and the auxiliary coil 39a is a second auxiliary coil.

Next, the transfer of a signal from the transmission circuit 12 to the reception circuit 32 is described. First, it is assumed that the switch 15 is controlled by the communication control circuit 11 such that its state is open, and the switch 35 is controlled by the communication control circuit 31 such that its state is open. A signal output from the transmission circuit 12 is transformed by the pulse transformer 13; passes first through the twisted pair cable 60, then through the electrical coupler 52, and then through the twisted pair cable 61; is transformed by the pulse transformer 33; and is thereafter received by the reception circuit 32. Here, in the pulse transformer 13, the coils 17a and 17b are connected each other with an alternating current via the capacitor 18. Therefore, with respect to a signal input from the transmission circuit 12, the pulse transformer 13 functions in an identical manner to that in a case where the coils 17a and 17b are directly connected each other. Further, in the pulse transformer 33, the coils 37a and 37b are connected each other with an alternating current via the capacitor 38. Therefore, with respect to a signal input via the twisted pair cable 61, the pulse transformer 33 functions in an identical manner to that in a case where the coils 37a and 37b are directly connected each other. The same principle is applied in the transfer of a signal from the transmission circuit 42 to the reception circuit 22.

The transmission circuit 12 and the reception circuit 32 perform communication by using a differential signal. Similarly, the transmission circuit 42 and the reception circuit 22 perform communication by using a differential signal.

Figure 2:
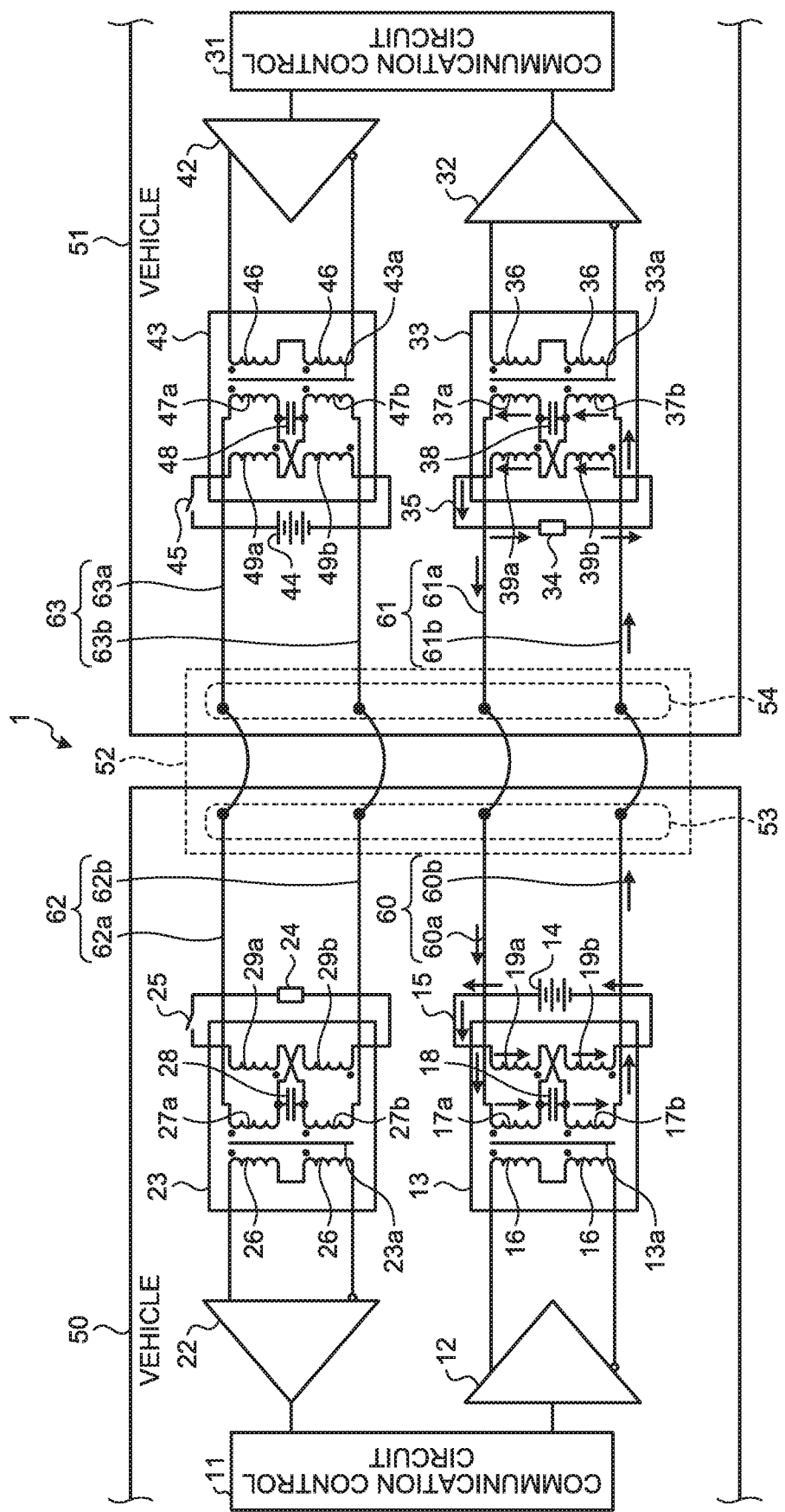
FIG. 2 is an explanatory diagram of an operation in the first embodiment.

Next, an operation in the present embodiment is described with reference to FIG. 2. FIG. 2 is an explanatory diagram of the operation in the present embodiment. In the following descriptions, described is an operation in which an oxide film, formed on a surface of at least one of contact portions of the electrical couplers 53 and 54 used for transferring a signal from the transmission circuit 12 to the reception circuit 32, is broken. In FIG. 2, the route of a direct current is indicated by arrows in the configuration of FIG. 1.

First, the switch 15 is closed under the control of the communication control circuit 11, and the switch 35 is closed under the control of the communication control circuit 31. Either of the switches 15 and 35 can be closed firster, or they can be closed simultaneously. The switches 15 and 35 are controlled in such a manner that a time period is present during which both the switches 15 and 35 are closed.

When the switches 15 and 35 are closed, the direct-current power supply 14 is connected to the load resistance 34 via the electrical coupler 52. Specifically, a closed loop is formed in which a direct current flows through the direct-current power supply 14, the auxiliary coil 19a, the coil 17b, the transfer path 60b, the electrical coupler 52, the transfer path 61b, the coil 37b, the auxiliary coil 39a, the load resistance 34, the auxiliary coil 39b, the coil 37a, the transfer path 61a, the electrical coupler 52, the transfer path 60a, the coil 17a, the auxiliary coil 19b, and the direct-current power supply 14 in this order. With this configuration, the direct-current power supply 14 can apply a direct-current voltage across the contact portions of the electrical couplers 53 and 54, so that it is possible to break an oxide film if the oxide film is formed on a surface of at least one of the contact portions. In this manner, when the switches 15 and 35 are closed, the auxiliary coils 19a and 19b are connected each other via the direct-current power supply 14; and the auxiliary coils 39a and 39b are connected each other via the load resistance 34, so that it is possible to apply the direct-current voltage across the contact portions of the electrical couplers 53 and 54. The load resistance 34 is inserted in order to prevent an excessively large direct current from flowing therethrough.

In this connection, the auxiliary coil 19a is wound around the core 13a but in the opposite direction to the coil 17b such that it has the same number of turns as the coil 17b; and the auxiliary coil 19b is wound around the core 13a but in the opposite direction to the coil 17a such that it has the same number of turns as the coil 17a. Therefore, a magnetic field generated in the coil 17b by the direct current is canceled by a magnetic field generated in the auxiliary coil 19a by the direct current; and a magnetic field generated in the coil 17a by the direct current is canceled by a magnetic field generated in the auxiliary coil 19b by the direct current. Accordingly, magnetic saturation of the core 13a by the magnetic fields generated by the direct current can be avoided.

Similarly, the auxiliary coil 39a is wound around the core 33a but in the opposite direction to the coil 37b such that it has the same number of turns as the coil 37b; and the auxiliary coil 39b is wound around the core 33a but in the opposite direction to the coil 37a such that it has the same number of turns as the coil 37a. Therefore, a magnetic field generated in the coil 37b by the direct current is canceled by a magnetic field generated in the auxiliary coil 39a by the direct current; and a magnetic field generated in the coil 37a by the direct current is canceled by a magnetic field generated in the auxiliary coil 39b by the direct current. Accordingly, magnetic saturation of the core 33a by the magnetic fields generated by the direct current can be avoided.

The communication control circuit 11 then opens the switch 15 when a predetermined time passes after the switch 15 is closed. Similarly, the communication control circuit 31 opens the switch 35 when a predetermined time passes after the switch 35 is closed.

An operation can be also described identically that breaks an oxide film formed on a surface of at least one of the contact portions of the electrical couplers 53 and 54 used for transferring a signal from the transmission circuit 42 to the reception circuit 22.

As described above, in the present embodiment, a fritting circuit is formed by closing the switches 15 and 35, in which a direct current flows through the direct-current power supply 14, the auxiliary coil 19a, the coil 17b, the transfer path 60b, the electrical coupler 52, the transfer path 61b, the coil 37b, the auxiliary coil 39a, the load resistance 34, the auxiliary coil 39b, the coil 37a, the transfer path 61a, the electrical coupler 52, the transfer path 60a, the coil 17a, the auxiliary coil 19b, and the direct-current power supply 14 in this order. Therefore, it is possible to break an oxide film that is formed on a surface of at least one of contact portions of the electrical couplers 53 and 54 that are used for transferring a signal from the transmission circuit 12 to the reception circuit 32.

Similarly, in the present embodiment, a fritting circuit is formed by closing the switches 45 and 25, in which a direct current flows through the direct-current power supply 44, the auxiliary coil 49a, the coil 47b, the transfer path 63b, the electrical coupler 52, the transfer path 62b, the coil 27b, the auxiliary coil 29a, the load resistance 24, the auxiliary coil 29b, the coil 27a, the transfer path 62a, the electrical coupler 52, the transfer path 63a, the coil 47a, the auxiliary coil 49b, and the direct-current power supply 44 in this order. Therefore, it is possible to break an oxide film that is formed on a surface of at least one of the contact portions of the electrical couplers 53 and 54 that are used for transferring a signal from the transmission circuit 42 to the reception circuit 22.

Further, in the present embodiment, a magnetic field generated in the coil 17b by a direct current can be canceled by a magnetic field generated in the auxiliary coil 19a by the direct current; a magnetic field generated in the coil 17a by the direct current can be canceled by a magnetic field generated in the auxiliary coil 19b by the direct current; a magnetic field generated in the coil 37b by the direct current can be canceled by a magnetic field generated in the auxiliary coil 39a by the direct current; and a magnetic field generated in the coil 37a by the direct current can be canceled by a magnetic field generated in the auxiliary coil 39b by the direct current. Therefore, magnetic saturation cannot occur in the cores 13a and 33a by the direct current. Consequently, it is possible to suppress degradation of signal quality even in a case where a direct current is caused to flow during transfer of a signal.

Similarly, in the present embodiment, a magnetic field generated in the coil 47b by a direct current can be canceled by a magnetic field generated in the auxiliary coil 49a by the direct current; a magnetic field generated in the coil 47a by the direct current can be canceled by a magnetic field generated in the auxiliary coil 49b by the direct current; a magnetic field generated in the coil 27b by the direct current can be canceled by a magnetic field generated in the auxiliary coil 29a by the direct current; and a magnetic field generated in the coil 27a by the direct current can be canceled by a magnetic field generated in the auxiliary coil 29b by the direct current. Therefore, magnetic saturation cannot occur in the cores 23a and 43a by the direct current. Consequently, it is possible to suppress degradation of signal quality even in a case where a direct current is caused to flow during transfer of a signal.

As described above, according to the present embodiment, it is possible to break an oxide film on a surface of a contact portion of the electrical coupler 53 or 54, while suppressing degradation of signal quality.

Although the numbers of turns of the coils 17a and 17b are equal to each other in the present embodiment, they can be different from each other. The same is true for the coils 27a and 27b, the coils 37a and 37b, and the coils 47a and 47b.

Further, in FIG. 1, the auxiliary coil 19a and the coil 17b are directly connected each other and the auxiliary coil 19b and the coil 17a are directly connected each other. However, the auxiliary coil 19a and the coil 17a can be directly connected each other and the auxiliary coil 19b and the coil 17b can be directly connected each other. In this case, the number of turns of the auxiliary coil 19a is set to be equal to the number of turns of the coil 17a, and the number of turns of the auxiliary coil 19b is set to be equal to the number of turns of the coil 17b. The same is true for connections between the coils 27a and 27b and the auxiliary coils 29a and 29b, connections between the coils 37a and 37b and the auxiliary coils 39a and 39b, and connections between the coils 47a and 47b and the auxiliary coils 49a and 49b.

Further, in the present embodiment, the direct-current power supply 14 is mounted in the vehicle 50, and the load resistance 34 is mounted in the vehicle 51. However, the configuration is not limited thereto. The direct-current power supply 14 and the load resistance 34 can be exchanged and provided. Furthermore, both the direct-current power supply 14 and the load resistance 34 can be mounted in the vehicle 50 while the load resistance 34 is connected to the direct-current power supply 14 in series. Similarly, both the direct-current power supply 14 and the load resistance 34 can be mounted in the vehicle 51 while the load resistance 34 is connected to the direct-current power supply 14 in series. The same is true for the direct-current power supply 44 and the load resistance 24.

The direct-current power supply 14 can be a dedicated power supply or a power supply obtained by voltage conversion from another power supply mounted in the vehicle 50. The magnitude of a power-supply voltage is 48 V or 24 V, for example. The same is true for the direct-current power supply 44.

A time period, during which the switches 15 and 35 are closed and a direct current is caused to flow from the direct-current power supply 14, is a certain time after the power of each of the vehicles 50 and 51 is turned on or a certain time after detection of mechanical coupling of the vehicles 50 and 51 each other, for example. Alternatively, when the communication control circuit 11 detects a transfer failure in communication with the vehicle 51, the switches 15 and 35 can be closed to cause a direct current to flow from the direct-current power supply 14. Similarly, a time period, during which the switches 45 and 25 are closed and a direct current is caused to flow from the direct-current power supply 44, is a certain time after the power of each of the vehicles 50 and 51 is turned on or a certain time after detection of mechanical coupling of the vehicles 50 and 51 to each other, for example. Alternatively, when the communication control circuit 31 detects a transfer failure in communication with the vehicle 50, the switches 45 and 25 can be closed to cause a direct current to flow from the direct-current power supply 14.

Figure 3:
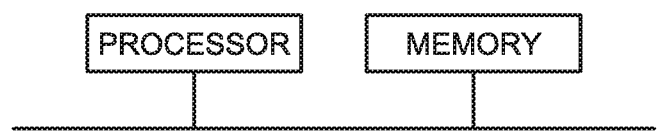
FIG. 3 illustrates a configuration example of a communication control circuit according to the first embodiment.

The communication control circuit 11 outputs a control signal to each of the switches 15 and 25, thereby controlling opening and closing of the switch 15 or 25. The same is true for the communication control circuit 31. FIG. 3 illustrates a configuration example of the communication control circuit 11. As illustrated in FIG. 3, the communication control circuit 11 includes a processor and a memory. The same is true for the communication control circuit 31.

As for the configuration of the switches 15 and 35, only either one can be provided. Similarly, as for the switches 25 and 45, only either one can be provided.

Second Embodiment

In the first embodiment, described is a case in which a system for transmitting and receiving a signal between the vehicles 50 and 51 is a full-duplex system. That is, in the first embodiment, the pulse transformer 13 is provided for the transmission circuit 12 and the pulse transformer 23 is provided for the reception circuit 22 in the vehicle 50; and the pulse transformer 43 is provided for the transmission circuit 42 and the pulse transformer 33 is provided for the reception circuit 32 in the vehicle 51.

In the present embodiment, described is a case in which the system for transmitting and receiving a signal between the vehicles 50 and 51 is a half-duplex system. That is, described is a case in which a common pulse transformer is provided for the transmission circuit 12 and the reception circuit 22 in the vehicle 50; and a common pulse transformer is provided for the transmission circuit 42 and the reception circuit 32 in the vehicle 51.

Figure 4:
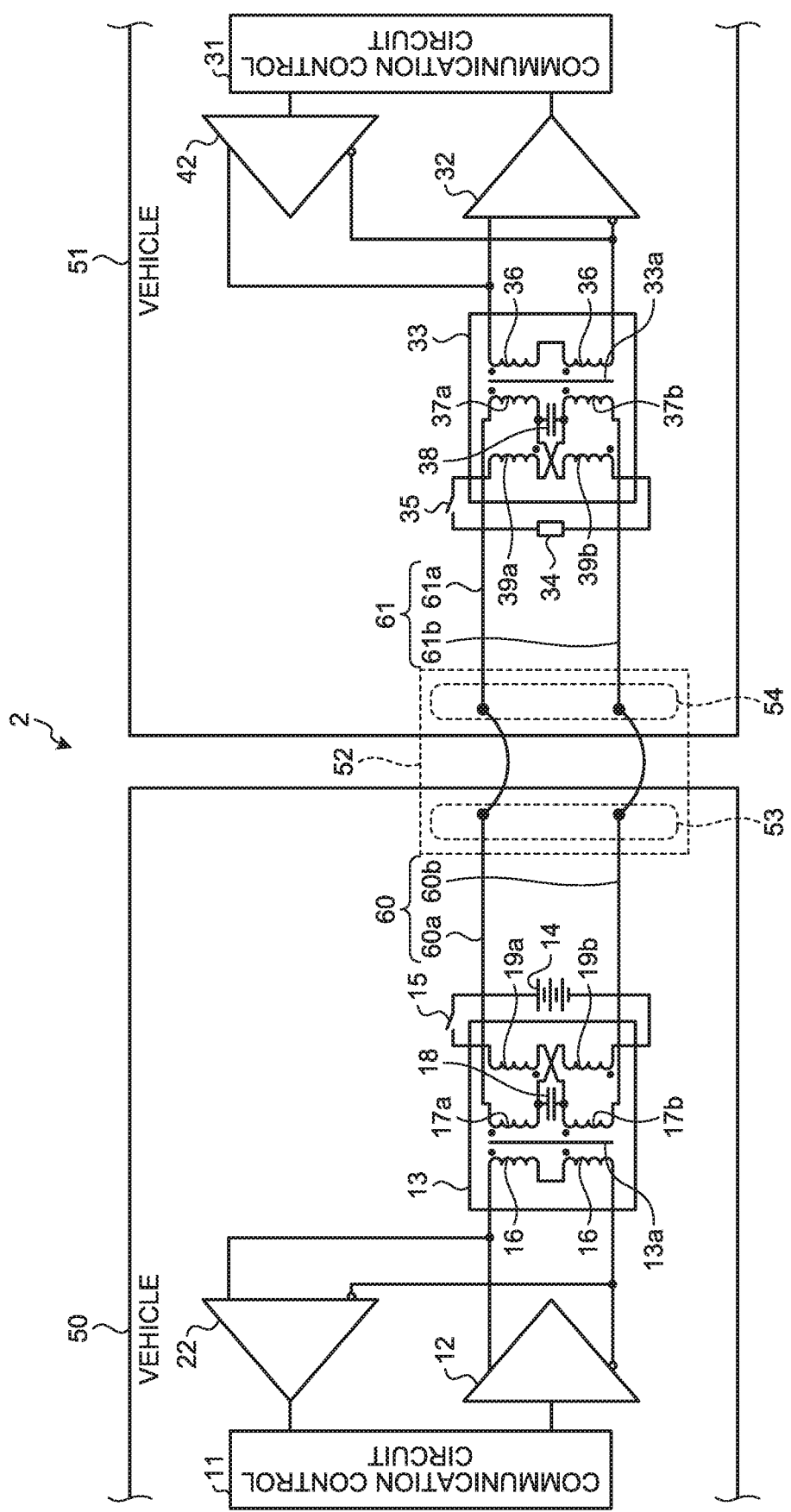
FIG. 4 illustrates a configuration example of an inter-vehicle transfer system according to a second embodiment.

FIG. 4 illustrates a configuration example of an inter-vehicle transfer system 2 according to the present embodiment. In FIG. 4, constituent elements identical to those illustrated in FIG. 1 are denoted by like reference signs.

The inter-vehicle transfer system 2 is configured to include an inter-vehicle transfer apparatus mounted in the vehicle 50, an inter-vehicle transfer apparatus mounted in the vehicle 51 mechanically coupled to the vehicle 50, and the electrical coupler 52 that electrically couples the vehicles 50 and 51 each other. The electrical coupler 52 is formed by the electrical coupler 53 provided in the vehicle 50; and the electrical coupler 54 provided in the vehicle 51 and can be coupled to the electrical coupler 53.

The inter-vehicle transfer apparatus mounted in the vehicle 50 includes the communication control circuit 11; the transmission circuit 12 connected to the communication control circuit 11; the reception circuit 22 connected to the communication control circuit 11; the pulse transformer 13 that is provided between the communication control circuit 11 and the electrical coupler 53 and is connected to the transmission circuit 12 and the reception circuit 22; the auxiliary coils 19a and 19b connected to the pulse transformer 13; the direct-current power supply 14 that is provided between the auxiliary coils 19a and 19b and is connected to the auxiliary coils 19a and 19b in series; the switch 15 connected to the auxiliary coils 19a and 19b and the direct-current power supply 14 in series; and the twisted pair cable 60 that connects the pulse transformer 13 and the electrical coupler 53 each other.

The inter-vehicle transfer apparatus mounted in the vehicle 51 includes the communication control circuit 31; the transmission circuit 42 connected to the communication control circuit 31; the reception circuit 32 connected to the communication control circuit 31; the pulse transformer 33 that is provided between the communication control circuit 31 and the electrical coupler 54 and is connected to the transmission circuit 42 and the reception circuit 32; the auxiliary coils 39a and 39b connected to the pulse transformer 33; the load resistance 34 that is provided between the auxiliary coils 39a and 39b and is connected to the auxiliary coils 39a and 39b in series; the switch 35 connected to the auxiliary coils 39a and 39b and the load resistance 34 in series; and the twisted pair cable 61 that connects the pulse transformer 33 and the electrical coupler 54 each other.

In this manner, in the present embodiment, the transmission circuit 12 and the reception circuit 22 are connected to the pulse transformer 13 in parallel, and the transmission circuit 42 and the reception circuit 32 are connected to the pulse transformer 33 in parallel.

The operation in the present embodiment is identical to the operation in the first embodiment. That is, when the switch 15 is closed under the control of the communication control circuit 11 and the switch 35 is closed under the control of the communication control circuit 31, then, the direct-current power supply 14 is connected to the load resistance 34 via the electrical coupler 52. Specifically, a closed loop is formed in which a direct current flows through the direct-current power supply 14, the auxiliary coil 19a, the coil 17b, the transfer path 60b, the electrical coupler 52, the transfer path 61b, the coil 37b, the auxiliary coil 39a, the load resistance 34, the auxiliary coil 39b, the coil 37a, the transfer path 61a, the electrical coupler 52, the transfer path 60a, the coil 17a, the auxiliary coil 19b, and the direct-current power supply 14 in this order. With this configuration, the direct-current power supply 14 can apply a direct-current voltage across contact portions of the electrical couplers 53 and 54 so that it is possible to break an oxide film if an oxide film is formed on a surface of at least one of the contact portions. When a predetermined time has passed after the switch 15 is closed, the communication control circuit 11 controls the switch 15 such that its state is open. Similarly, when a predetermined time passes after the switch 35 is closed, the communication control circuit 31 controls the switch 35 such that its state is open.

In the present embodiment, a half-duplex system is employed, and therefore the circuit configuration is simplified as compared to that of the first embodiment. Other configurations, operations, and effects of the present embodiment are identical to those of the first embodiment.

The configurations described in the above embodiments are only examples of the content of the present invention. The configurations can be combined with other well-known techniques, and a part of each configuration can be omitted or modified without departing from the scope of the present invention.

REFERENCE SIGNS LIST

1, 2 inter-vehicle transfer system, 11, 31 communication control circuit, 12, 42 transmission circuit, 13, 23, 33, 43, 70, 75 pulse transformer, 13a, 23a, 33a, 43a core, 14, 44 direct-current power supply, 15, 25, 35, switch, 16, 17a, 17b, 26, 27a, 27b, 36, 37a, 37b, 46, 47a, 47b coil, 18, 28, 38, 48 capacitor, 19a, 19b, 29a, 29b, 39a, 39b, 49a, 49b auxiliary coil, 22, 32 reception circuit, 24, 34 load resistance, 50, 51 vehicle, 52, 53, 54 electrical coupler, 60, 61, 62, 63 twisted pair cable, 60a, 60b, 61a, 61b, 62a, 62b, 63a, 63b transfer path.

The invention claimed is:

1. An inter-vehicle transfer apparatus mounted in a vehicle to transfer a signal to another vehicle to which the vehicle is electrically coupled via an electrical coupler, the inter-vehicle transfer apparatus comprising:
   a pulse transformer including
      a first coil wound around a core and connected at one end to the electrical coupler,
      a capacitor connected at one end to the other end of the first coil, and
      a second coil
         wound around the core in a same direction as the first coil,
         connected at one end to the other end of the capacitor, and
         connected at the other end to the electrical coupler;
   a first auxiliary coil
      wound around the core in an opposite direction to the first and second coils and having an equal number of turns as the first coil, and
      connected at one end to the other end of the first coil; and
   a second auxiliary coil
      wound around the core in an opposite direction to the first and second coils and having an equal number of turns as the second coil, and
      connected at one end to the one end of the second coil, wherein
   the other end of the first auxiliary coil and the other end of the second auxiliary coil are connected to each other to enable application of a direct-current voltage across contact portions in the electrical coupler.

2. The inter-vehicle transfer apparatus according to claim 1, further comprising a direct-current power supply
   provided between the other end of the first auxiliary coil and the other end of the second auxiliary coil and
   connected to the first and second auxiliary coils in series.

3. The inter-vehicle transfer apparatus according to claim 2, further comprising a switch connected to the first auxiliary coil, the second auxiliary coil, and the direct-current power supply in series.

4. The inter-vehicle transfer apparatus according to claim 1, further comprising a load resistance
   provided between the other end of the first auxiliary coil and the other end of the second auxiliary coil and
   connected to the first and second auxiliary coils in series.

5. The inter-vehicle transfer apparatus according to claim 4, further comprising a switch connected to the first auxiliary coil, the second auxiliary coil, and the load resistance in series.

* * * * *